US011007964B2

(12) United States Patent
Tanaka et al.

(10) Patent No.: US 11,007,964 B2
(45) Date of Patent: May 18, 2021

(54) SEAT CUSHION AIRBAG APPARATUS

(71) Applicant: TOYODA GOSEI CO., LTD., Kiyosu (JP)

(72) Inventors: Koki Tanaka, Kiyosu (JP); Takashi Iida, Kiyosu (JP); Shigeyuki Suzuki, Kiyosu (JP); Tadashi Yamada, Kiyosu (JP); Yasushi Masuda, Kiyosu (JP); Hajime Kitte, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 87 days.

(21) Appl. No.: 16/523,196

(22) Filed: Jul. 26, 2019

(65) Prior Publication Data
US 2020/0039459 A1 Feb. 6, 2020

(30) Foreign Application Priority Data

Jul. 31, 2018 (JP) .............................. JP2018-143367

(51) Int. Cl.
*B60R 21/207* (2006.01)
*B60R 21/231* (2011.01)
*B60N 2/42* (2006.01)

(52) U.S. Cl.
CPC .............. *B60R 21/207* (2013.01); *B60N 2/42* (2013.01); *B60R 21/231* (2013.01)

(58) Field of Classification Search
CPC ....... B60R 21/207; B60R 21/231; B60N 2/42; B60N 2/4221; B60N 2/42763; B60N 2/4279
See application file for complete search history.

(56) References Cited

U.S. PATENT DOCUMENTS

| 3,330,598 | A  | * | 7/1967 | Whiteside | ................ | A47C 4/54 |
| | | | | | | 297/284.3 |
| 9,321,373 | B2 | * | 4/2016 | Sakata | .................... | B60N 2/914 |
| 9,428,137 | B2 | * | 8/2016 | Lee | ...................... | B60R 21/2334 |
| 9,994,138 | B2 | * | 6/2018 | Whitens | ............. | B60N 2/42763 |

(Continued)

FOREIGN PATENT DOCUMENTS

| JP | 2010-036693 A | 2/2010 |
| JP | 2010-052622 A | 3/2010 |
| JP | 5545282 B2 | 7/2014 |

*Primary Examiner* — Darlene P Condra
(74) *Attorney, Agent, or Firm* — Posz Law Group, PLC

(57) ABSTRACT

A seat cushion airbag apparatus is applied to a vehicle seat in which a seat cushion includes a cushion part and a support portion. An airbag, including an inflatable portion, is disposed between the support portion and the cushion part. The inflatable portion includes: a rear inflatable portion that inflates on a lower side of buttocks of an occupant; a front inflatable portion that inflates on a lower side of a femur of the occupant; and a connection portion that connects the rear inflatable portion and the front inflatable portion. A tilting plate is disposed between the support portion and the cushion part and is supported to be tiltable in an upper-lower direction by a shaft provided rearward of the front inflatable portion, the tilting plate including a flat pressure receiving portion that receives pressure of inflation gas from a lower side through at least the front inflatable portion.

2 Claims, 6 Drawing Sheets

(56) References Cited

U.S. PATENT DOCUMENTS

| | | | |
|---|---|---|---|
| 2003/0052519 A1* | 3/2003 | Reynolds | B60R 21/207 297/216.1 |
| 2013/0082457 A1 | 4/2013 | Hashido et al. | |
| 2014/0015234 A1* | 1/2014 | Nukaya | B60R 21/231 280/730.1 |
| 2015/0066308 A1* | 3/2015 | Nagasawa | B60R 21/01534 701/45 |
| 2015/0126916 A1* | 5/2015 | Hall | B60N 2/42 601/149 |
| 2019/0106029 A1* | 4/2019 | Komura | B60N 2/62 |
| 2019/0337427 A1* | 11/2019 | Thomas | B60N 2/427 |

* cited by examiner

SEAT CUSHION AIRBAG APPARATUS

CROSS-REFERENCE TO RELATED APPLICATION(S)

This application is based upon and claims the benefit of priority from prior Japanese patent application No. 2018-143367 filed on Jul. 31, 2018, the entire contents of which are incorporated herein by reference.

BACKGROUND

1. Field of the Invention

The present invention relates to a seat cushion airbag apparatus, in which an airbag disposed in a seat cushion of a vehicle seat is inflated by inflation gas to raise a seat surface when a shock is applied to a vehicle from front of the vehicle seat, so as to restrict a waist of an occupant on the seat cushion from moving forward.

2. Description of the Related Art

When a shock is applied to a vehicle from front due to a front collision or the like, there is a problem that a waist of an occupant restrained in a vehicle seat by a seat belt apparatus moves forward (forward slip) out of a lap belt portion. Various measures have been taken or proposed to prevent this phenomenon.

One of these measures provides a seat cushion airbag apparatus that is applied to a vehicle seat including a seat cushion supported by a support portion of a seat frame from a lower side (see, for example, JP-B-5545282).

The seat cushion airbag apparatus includes an airbag and a gas generator. The airbag is disposed between the support portion and the seat cushion. The gas generator is disposed at a front end portion in the airbag and is fastened to the support portion.

Therefore, when a shock is applied to a vehicle from front of the vehicle seat due to a front collision or the like, an occupant moves forward due to inertia. The occupant is held on the seat cushion by holding action of a seat belt apparatus. However, a waist of the occupant may move forward depending on a posture of the occupant.

On the other hand, in the seat cushion airbag apparatus, inflation gas is ejected from the gas generator in response to the shock from front, so that the airbag is inflated. The seat cushion is pushed up by the inflating airbag and a seat surface of the seat cushion is raised. A Femur of the occupant restrained in the vehicle seat by the seat belt apparatus is pushed upward and the waist is pressed against the lap belt portion. A performance of the lap belt to restrain the waist is enhanced, so that forward movement (forward slip) of the waist is restricted.

However, with development of an automatic driving technique, it is conceivable that changes occur in seat arrangement and a seated posture of the occupant. That is, driving operation is performed on behalf of a driver during automatical driving of a vehicle, and the driver is released from the driving operation. It is conceivable that an occupant including the driver adopts a relaxed posture (comfortable posture) by reclining a seat back further rearward than in manual driving.

The seat cushion airbag apparatus in the related art is designed on a premise that an occupant is seated in the vehicle seat in a posture suitable for manual driving. For this reason, when the occupant is seated in the vehicle seat in a comfortable posture as described above and, for example, another vehicle that is manually operated collides with the vehicle from front and a shock is applied to the vehicle from front, an effect of restricting forward movement of the waist of the occupant may not be sufficiently obtained.

SUMMARY

The present invention is made in view of the above circumstance, and an object thereof is to provide a seat cushion airbag apparatus that can restrict forward movement of a waist of an occupant even when in a comfortable posture.

In order to solve the above problem, there is provided a seat cushion airbag apparatus applied to a vehicle seat in which a seat cushion includes a cushion part and a support portion that supports the cushion part from a lower side. In the seat cushion airbag apparatus, an airbag including an inflatable portion is disposed between the support portion and the cushion part, and the inflatable portion is inflated by inflation gas supplied from a gas generator, so that a seat surface of the seat cushion is raised to restrict forward movement of a waist of an occupant on the seat cushion. The inflatable portion includes a rear inflatable portion that includes the gas generator and inflates on a lower side of buttocks of the occupant, a front inflatable portion that inflates on a lower side of a femur of the occupant, and a connection portion that connects the rear inflatable portion and the front inflatable portion. A tilting plate is disposed between the support portion and the cushion part and is supported to be tiltable in an upper-lower direction by a shaft provided rearward of the front inflatable portion, the tilting plate including a flat pressure receiving portion that receives pressure of inflation gas from a lower side through at least the front inflatable portion.

When a shock is applied to a vehicle from front of the vehicle seat due to a front collision or the like, the occupant moves forward due to inertia. At this time, when the occupant is in a comfortable posture, that is, leaning on a seat back turned rearward relative to in manual driving, an upper body of the occupant and a lap belt portion of a seat belt apparatus are reclined rearward relative to in manual driving, and the waist may not be properly caught by the lap belt portion when a shock is applied to the vehicle.

In contrast, according to the seat cushion airbag apparatus having the above configuration, inflation gas is supplied to the rear inflatable portion from the gas generator in response to the shock from front. The rear inflatable portion inflates on the lower side of the buttocks of the occupant due to inflation gas, so that a part of the cushion part on the lower side of the buttocks are pushed up. A part of the seat surface of the seat cushion on the lower side of the buttocks is raised, so that the buttocks are pushed up and the waist is pressed against the lap belt portion. As the buttocks are pushed up, the lap belt portion is also reclined to the same level as in manual driving. A performance of the lap belt to restrain the waist is enhanced, so that forward movement of the waist is restricted.

Further, a part of inflation gas supplied to the rear inflatable portion is supplied to the front inflatable portion through the connection portion. The front inflatable portion inflates on the lower side of the femur of the occupant due to inflation gas, so that a part of the cushion part on the lower side of the femur is pushed up. A part of the seat surface of the seat cushion on the lower side of the femur PF is raised. The femur is pushed up by the raised part of the seat surface. Accordingly, the buttocks are pushed up and the waist is pressed against the lap belt portion. A performance of the lap belt to restrain the waist is further enhanced, so that forward movement of the waist is further restricted. Further, the raised part of the seat surface of the seat cushion on the lower side of the femur reclines the femur to be higher toward a front side, so as to restrict the femur and further the waist from moving forward.

An inflation thickness of the inflatable portion including the front inflatable portion decreases as approaching a peripheral portion thereof. Accordingly, an amount for the inflatable portion to push up the cushion part and raise the seat surface decreases as approaching the peripheral portion.

In this regard, the pressure receiving portion of the tilting plate according to the above configuration receives pressure of inflation gas from a lower side through at least the front inflatable portion of the inflatable portion of the airbag. The tilting plate is tilted upward with the shaft as a fulcrum, and is reclined greater than before tilting. An amount for the front inflatable portion to push up the part of the cushion part on the lower side of the femur is the same as an amount at a part having a large inflation thickness even at a part having a small inflation thickness, since the flat pressure receiving portion is interposed therebetween. Therefore, compared with a case without the tilting plate, both a performance of pushing up the buttocks and pressing the waist against the lap belt portion and a performance of reclining the femur to be higher toward the front side thereof are improved.

In the seat cushion airbag apparatus, the pressure receiving portion is preferably provided forward of the rear inflatable portion.

When the hard pressure receiving portion is located on the lower side of the buttocks, sitting comfort is impaired. However, according to the above configuration, the pressure receiving portion is provided forward of the rear inflatable portion. In other words, the pressure receiving portion is not provided between the rear inflatable portion and the cushion part. Accordingly, a decrease in the sitting comfort due to the pressure receiving portion is prevented.

In the seat cushion airbag apparatus, the rear inflatable portion preferably includes a lower rear inflatable portion that is mounted on the support portion and is connected to the front inflatable portion by the connection portion, and an upper rear inflatable portion that is mounted on the lower rear inflatable portion and is connected to the lower rear inflatable portion.

According to the configuration, inflation gas is supplied to the rear inflatable portion from the gas generator when a shock is applied to the vehicle from front of the vehicle seat. With inflation gas, the lower rear inflatable portion and the upper rear inflatable portion in the rear inflatable portion inflate on a lower side of the buttocks of the occupant, respectively. Therefore, a rear inflatable portion inflates to a higher position as compared with a case where the rear inflatable portion includes the lower rear inflatable portion only. Accordingly, the buttocks are pushed up to a higher position compared with the case where the rear inflatable portion includes the lower rear inflatable portion only, and the waist is strongly pressed against the lap belt portion. A performance of the lap belt to restrain the waist is further enhanced, so that forward movement of the waist is further restricted.

In the seat cushion airbag apparatus, the lower rear inflatable portion and the upper rear inflatable portion are preferably connected with each other at their respective rear end portions. The airbag preferably includes a first non-inflatable portion that does not inflate by inflation gas at a part between the front inflatable portion and the lower rear inflatable portion that is different from the connection portion, and a second non-inflatable portion that does not inflate by inflation gas on an external side of the upper rear inflatable portion. The second non-inflatable portion is preferably coupled to the first non-inflatable portion by a coupling portion.

According to the configuration, the upper rear inflatable portion mounted on the lower rear inflatable portion is connected thereto at its own rear end portion. The second non-inflatable portion provided on the external side of the upper rear inflatable portion is coupled to the first non-inflatable portion that is provided at a part between the front inflatable portion and the lower rear inflatable portion that is different from the connection portion position. Therefore, the upper rear inflatable portion inflates on the lower rear inflatable portion in a stable state.

The first non-inflatable portions and the second non-inflatable portion are coupled by the coupling portion. For this reason, the coupling portion is unlikely to hinder inflation of portions of the inflatable portion, that is, the front inflatable portion, the lower rear inflatable portion, the upper rear inflatable portion, and the connection portion. The coupling portion is unlikely to be broken even when the portions of the inflatable portion inflate, so that coupling by the coupling portion is well maintained.

According to the seat cushion airbag apparatus, it is possible to restrict forward movement of a waist of an occupant even in a comfortable posture.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, the first embodiment embodied in a vehicle seat cushion airbag apparatus (hereinafter, simply referred to as "airbag apparatus") will be described with reference to FIGS. 1 to 5.

Figure 2:
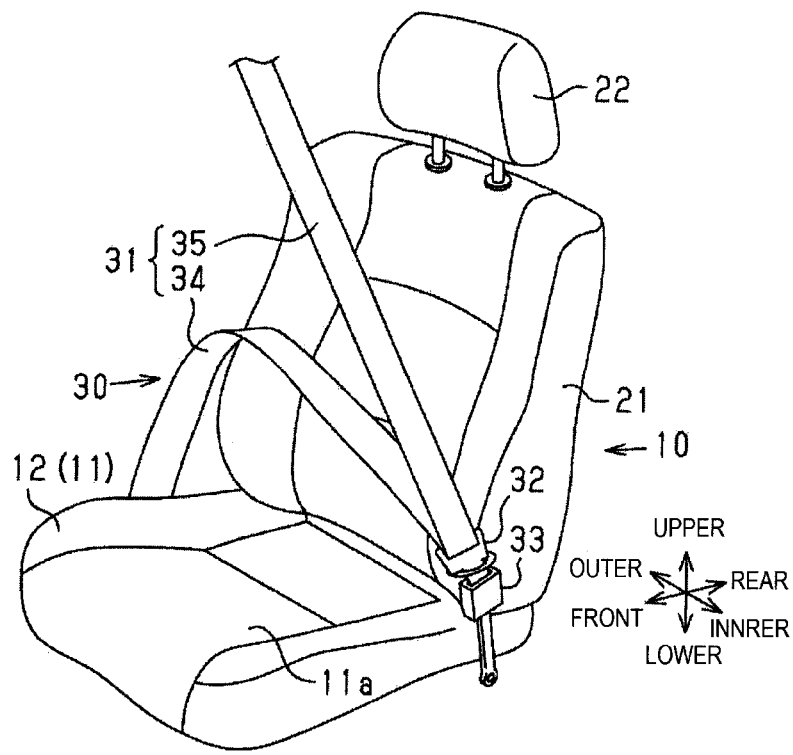
FIG. 2 is a perspective view illustrating the vehicle seat and the seat belt apparatus according to the first embodiment.

In the following description, a traveling direction of a vehicle is referred to as "front", and front, rear, upper, lower, left, and right are defined on a basis thereof. In FIG. 2, "inner" indicates a vehicle inner side, and "outer" indicates a vehicle outer side. The vehicle inner side is near a central position in a width direction of the vehicle (vehicle width direction), while the vehicle outer side is away from the central position. It is assumed that an occupant having the same size as that of a crash test dummy is seated in a vehicle seat.

Figure 1:
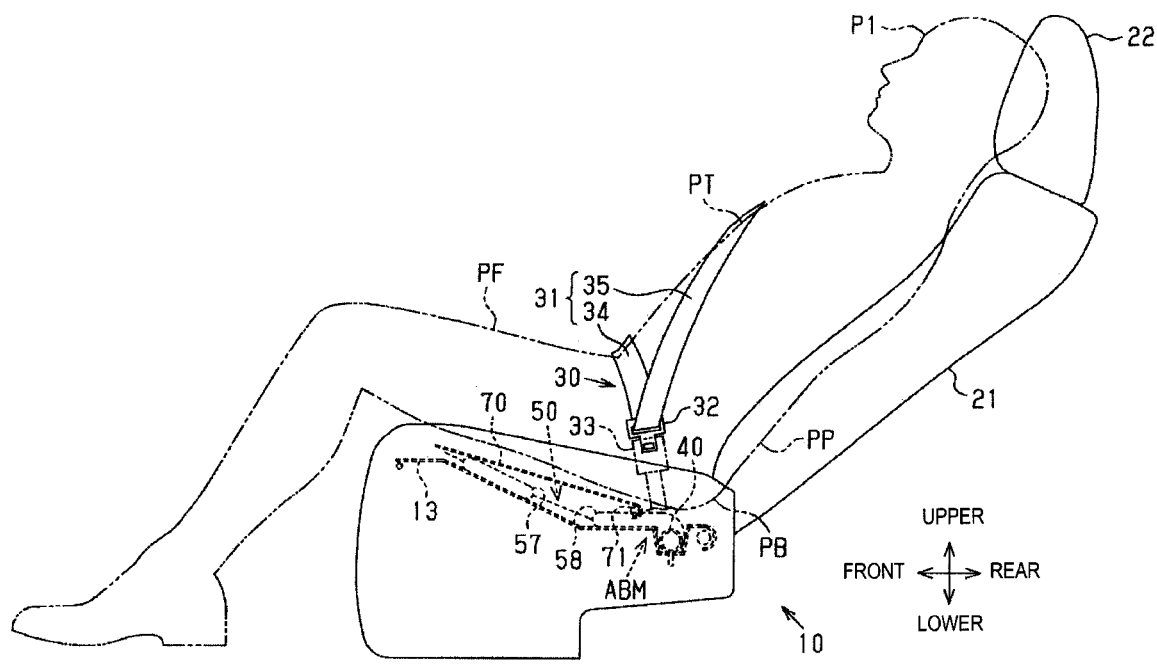
FIG. 1 illustrates a first embodiment embodied in a vehicle seat cushion airbag apparatus, and is a side view illustrating a vehicle seat, in which the airbag apparatus is assembled, together with an occupant and a seat belt apparatus.

As illustrated in FIGS. 1 and 2, a vehicle seat 10 is disposed in the vehicle as the vehicle seat. The vehicle seat 10 includes a seat cushion (seat portion) 11, a seat back (backrest portion) 21 that is erected from a rear portion of the seat cushion 11 and allows adjustment of an angle of inclination, and a headrest 22 disposed on an upper side of the seat back 21. The vehicle seat 10 is disposed in the vehicle in a posture in which the seat back 21 faces front of the vehicle. A front-rear direction of the vehicle seat 10 disposed in this manner coincides with a front-rear direction of the vehicle; a width direction of the vehicle seat 10 coincides with the vehicle width direction.

Figure 3:
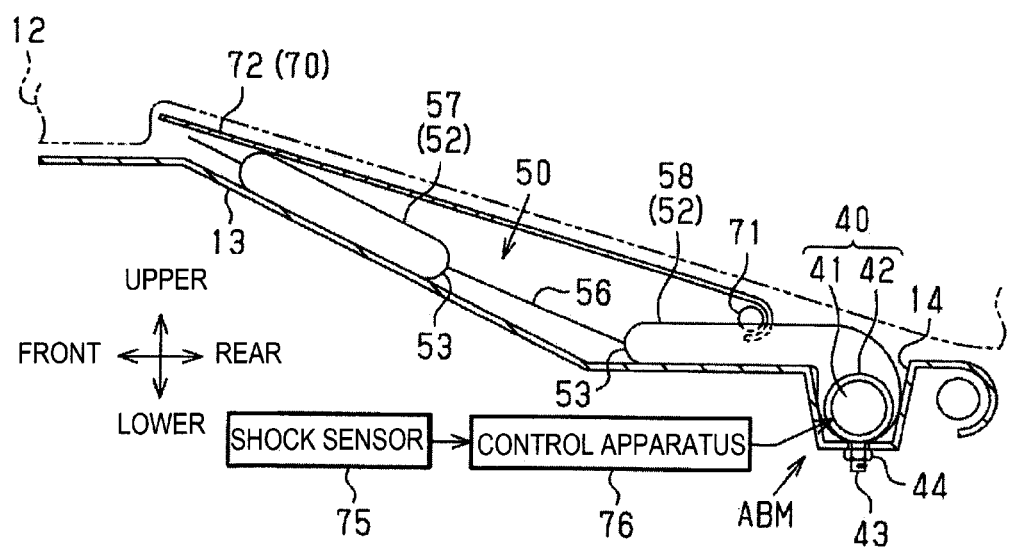
FIG. 3 is a side cross-sectional view illustrating a state of the seat cushion airbag apparatus before an inflatable portion of an airbag inflates according to the first embodiment.

As illustrated in FIGS. 2 and 3, the seat cushion 11 includes a cushion part 12 and a seat pan 13 formed of a steel plate that serves as a support portion to support the cushion part 12 from a lower side. The seat pan 13 is provided with, in a rear portion, an accommodation recess 14 that accommodates a rear portion of an airbag module ABM to be described below. The accommodation recess 14 extends in the vehicle width direction with its upper surface opened.

As illustrated in FIGS. 1 and 2, the vehicle is equipped with a seat belt apparatus 30 that restrains an occupant P1 seated in the vehicle seat 10.

The seat belt apparatus 30 includes a belt-shaped webbing 31 that restrains the occupant P1, a tongue 32 movably attached to the webbing 31 in a longitudinal direction thereof, and a buckle 33 disposed on the vehicle inner side of the seat cushion 11. The tongue 32 can be locked to and unlocked from the seat cushion 11. One end portion of the webbing 31 is fixed to the vehicle outer side of the seat cushion 11; another end portion thereof is wound by a belt winding apparatus (not illustrated) disposed on the same vehicle outer side. In the seat belt apparatus 30, since the tongue 32 slides along the webbing 31, lengths of a lap belt portion 34 and a shoulder belt portion 35 can be adjusted.

The lap belt portion 34 is a part of the webbing 31 from the tongue 32 to an end portion (fixed end) of the webbing 31, and bridges the seated occupant P1 from one side of a waist PP thereof to another side through front of the waist PP. The shoulder belt portion 35 is a part of the webbing 31 from the tongue 32 to the belt winding apparatus, and bridges the seated occupant P1 from a shoulder thereof to a lateral side of the waist PP obliquely through front of a chest PT of the occupant P1.

The vehicle is provided with an airbag apparatus for preventing a submarine phenomenon. The submarine phenomenon occurs when a shock is applied to the vehicle from front due to a front collision or the like, during which the waist PP of the occupant P1, which is restrained in the vehicle seat 10 by the seat belt apparatus 30, moves forward (forward slip) out of the lap belt portion 34.

As illustrated in FIG. 3, the airbag apparatus includes the airbag module ABM, a tilting plate 70, a shock sensor 75, and a control apparatus 76. The airbag module ABM includes a gas generator 40 and an airbag 50. Portions constituting the airbag apparatus will be described below.

Figure 4:
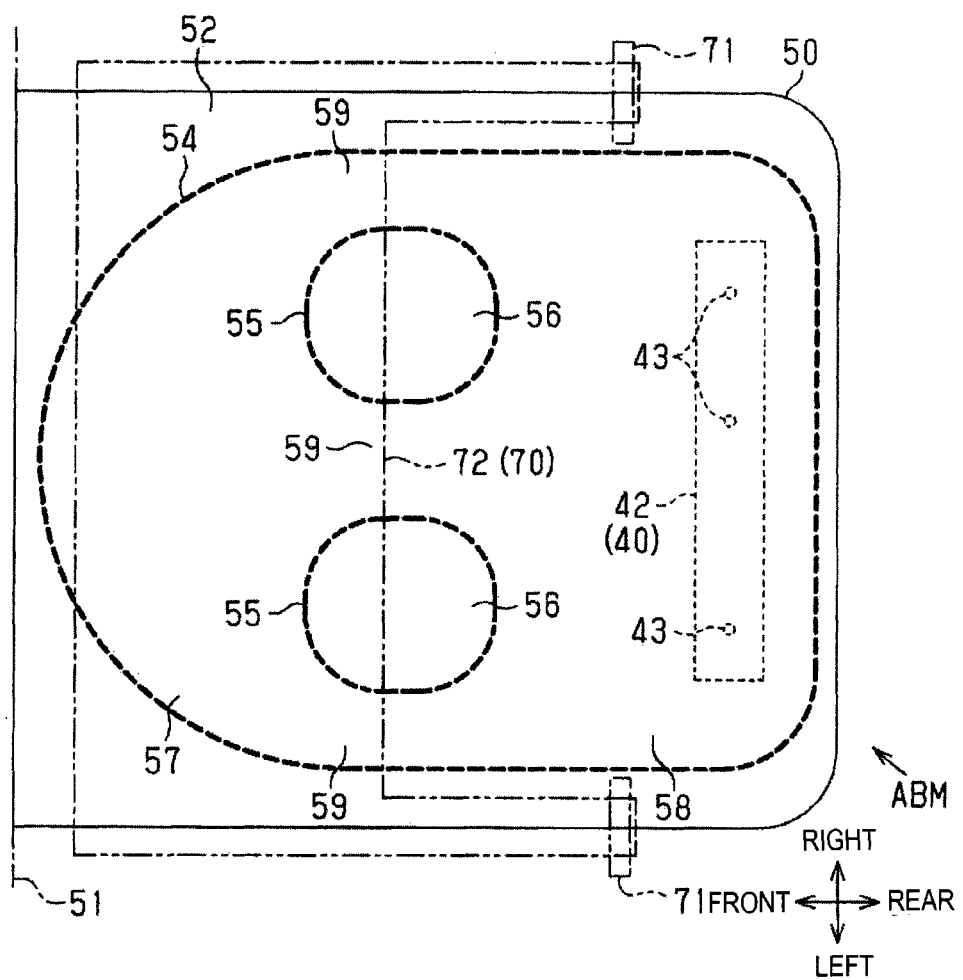
FIG. 4 is a plan view illustrating an airbag module together with a tilting plate according to the first embodiment.
Figure 5:
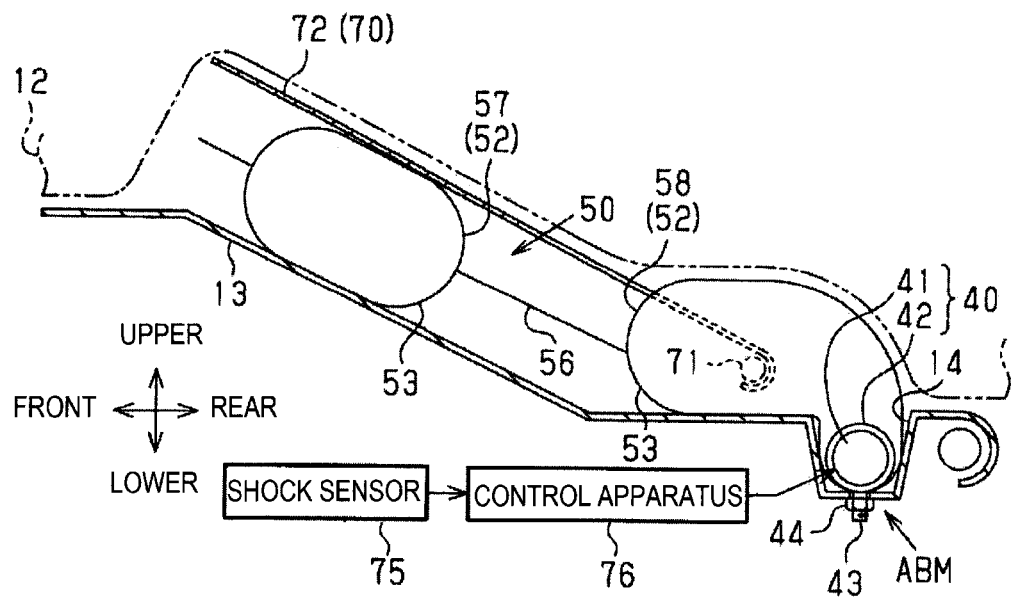
FIG. 5 is a side cross-sectional view illustrating a state of the seat cushion airbag apparatus when the inflatable portion of the airbag inflates according to the first embodiment.

As illustrated in FIGS. 3 and 4, the gas generator 40 supplies inflation gas to the airbag 50 and includes an inflator 41 and a retainer 42 that covers the inflator 41. Here, the inflator 41 is of a pyro type. The inflator 41 has an elongated shape (substantially cylindrical shape) extending in the vehicle width direction, in which a gas generating agent (not illustrated) that generates inflation gas is accommodated. The inflator 41 is provided with, at one end portion in the vehicle width direction, a gas ejecting portion (not illustrated) that ejects inflation gas, and is connected with a harness (not illustrated) serving as an input wire for a control signal to the inflator 41 at another end portion thereof.

The inflator 41 may be of a type different from the above pyro type. Examples of such a type include a stored gas type, in which a partition wall of a high pressure gas cylinder filled with high pressure gas is ruptured by an explosive or the like so that expansion gas is ejected, and a hybrid type that combines both the pyro type and the stored gas type.

Most of the retainer 42 has a substantially cylindrical shape elongated in the vehicle width direction by bending a plate material such as a metal plate. Both end portions of the retainer 42 are open. The retainer 42 is provided with, on a lower surface thereof, a bolt 43 that extends downward and is fixed to a plurality of positions of the retainer 42 spaced apart from each other in the vehicle width direction.

The gas generator 40 may have a configuration in which the inflator 41 and the retainer 42 are integral.

The airbag 50 has a function of raising the seat surface 11a of the seat cushion 11 by inflating. The airbag 50 is formed by folding one or a plurality of substantially rectangular fabric pieces (also referred to as a base fabric, a panel fabric, or the like), which are superimposed on each other and elongated in the front-rear direction, along a fold line 51 in a central portion of the airbag 50 to be superimposed in an upper-lower direction and coupling two superimposed parts into a bag shape. In order to distinguish the two superimposed parts of the airbag 50 from each other, the part located on an upper side is referred to as an upper fabric portion 52, and the part located on a lower side is referred to as a lower fabric portion 53.

A material having high strength and flexibility is suitable for the upper fabric portion 52 and the lower fabric portion 53, for example, a woven fabric formed using a polyester yarn, a polyamide yarn, or the like.

The coupling of the upper fabric portion 52 and the lower fabric portion 53 is carried out at a peripheral coupling portion 54 provided at peripheral portions of the upper fabric portion 52 and the lower fabric portion 53. In other words, the peripheral portion of the lower fabric portion 53 and the peripheral portion of the upper fabric portion 52 are coupled by the peripheral coupling portion 54. In the first embodiment, the peripheral coupling portion 54 is formed by sewing the peripheral portions of the upper fabric portion 52 and the lower fabric portion 53 (with a sewing thread). The same applies to an annular coupling portion 55, an extension peripheral coupling portion 64, and a coupling portion 67 to be described below.

Figure 6:
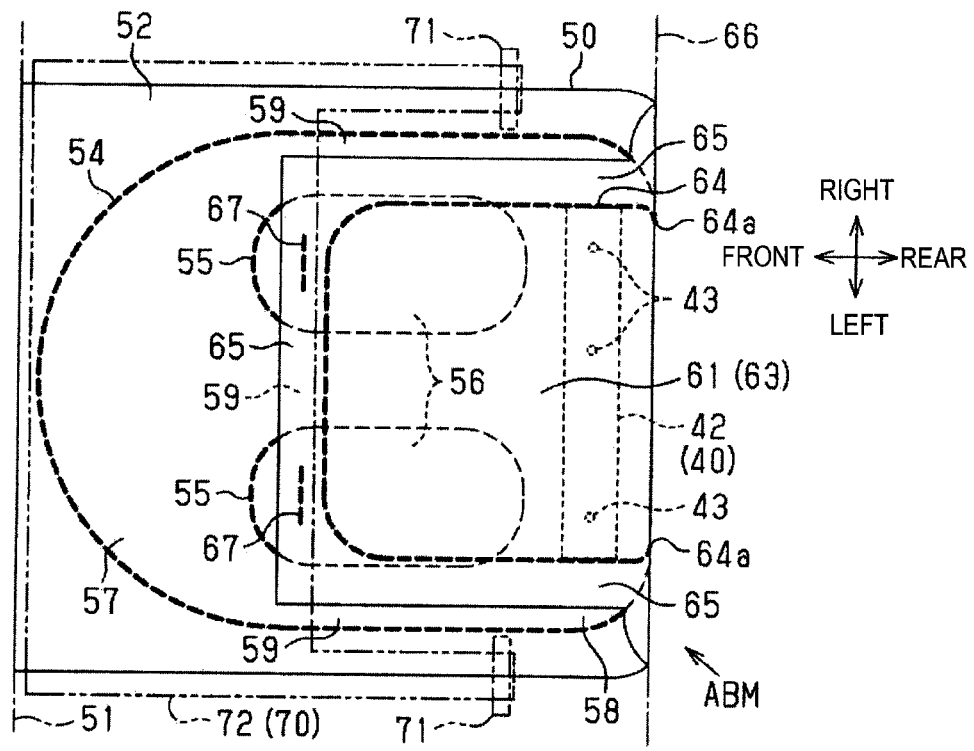
FIG. 6 illustrates a second embodiment embodied in a vehicle seat cushion airbag apparatus, and is a plan view illustrating an airbag module together with a tilting plate.
Figure 7:
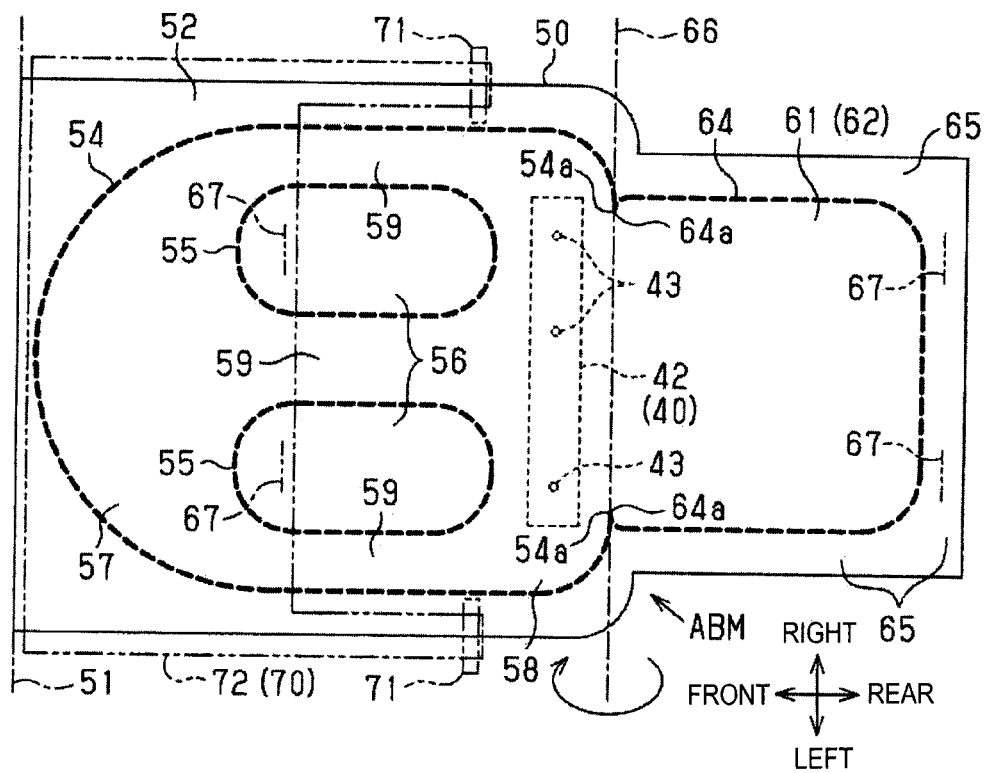
FIG. 7 is a plan view illustrating a state before an upper rear inflatable portion is mounted on a lower rear inflatable portion according to the second embodiment.

Regarding the sewing described above, the sewn part is represented by two types of lines in FIGS. 4, 6, and 7. The first type of line is a thick line having a fixed length that is intermittently arranged, which indicates that seams of the sewing thread are visible directly (see the peripheral coupling portion 54 and the like in FIG. 4). The second type of line is a thin line having a fixed length (a length longer than a general dashed line) that is intermittently arranged, which indicates that seams are located on a back side of other members and are not directly visible (hidden) (see a portion of the annular coupling portion 55 in FIG. 6).

In the first embodiment, since the airbag 50 has a configuration in which a fabric piece is folded into two along the fold line 51, the coupling (sewing) via the peripheral coupling portion 54 in a vicinity of the fold line 51 can be omitted.

In the first embodiment, although the fabric piece is folded into two such that the fold line 51 is located at a front end portion of the airbag 50, the fabric piece may be folded into two such that the fold line 51 is located at another end portion of the airbag 50. The airbag 50 may also include a plurality of fabric pieces divided along the fold line 51. In this case, the airbag 50 is formed by superimposing the plurality of fabric pieces in the upper-lower direction and coupling the fabric pieces into a bag shape. A strength of the airbag 50 increases as the number of fabric pieces used increases.

The peripheral coupling portion 54 may be formed by a coupling method different from the sewing using a sewing thread such as adhesion using an adhesive and welding. The same applies to the annular coupling portion 55, the extension peripheral coupling portion 64, and the coupling portion 67 to be described below.

As illustrated in FIGS. 3 and 4, the upper fabric portion 52 and the lower fabric portion 53 are coupled by a plurality of (two in the first embodiment) annular coupling portions 55, which are provided at places away from the peripheral edge coupling portion 54, in a region surrounded by the peripheral coupling portion 54. The upper fabric portion 52 and the lower fabric portion 53 are coupled to be in contact with each other by the annular coupling portions 55.

The two annular coupling portions 55 are located at an middle part of the region surrounded by the peripheral coupling portion 54 in the front-rear direction. The annular coupling portions 55 are located at places spaced apart from each other in the vehicle width direction. Regions between the upper fabric portion 52 and the lower fabric portion 53 that are surrounded by the annular coupling portions 55 are not supplied with inflation gas, so as to form first non-inflatable portions 56 that do not inflate.

The region surrounded by the peripheral coupling portion 54 in the airbag 50 excluding the two first non-inflatable portions 56 forms an inflatable portion that inflates by inflation gas. The inflatable portion includes a front inflatable portion 57, a rear inflatable portion, and a connection portion 59.

The connection portion 59 of the inflatable portion includes parts on both sides of the first non-inflating portions 56 in the vehicle width direction. The first embodiment provides three connection portions 59 since two first non-inflatable portions 56 are provided.

The front inflatable portion 57 of the inflatable portion includes a part in front of the first non-inflatable portions 56 and the connection portion 59, and inflates on a lower side of femur PF of the occupant P1. The rear inflatable portion of the inflatable portion includes a part in rear of the first non-inflatable portions 56 and the connection portion 59, and inflates on a lower side of buttocks PB of the occupant P1. In the first embodiment, the rear inflatable portion includes only a lower rear inflatable portion 58 that is in contact with the seat pan 13. The front inflatable portion 57 and the lower rear inflatable portion 58 are connected with each other by the connection portion 59.

The gas generator 40 is disposed (built-in) in a posture extending in the vehicle width direction at a rear portion in the lower rear inflatable portion 58. The plurality of bolts 43 in the gas generator 40 are inserted into the lower fabric portion 53. The harness is drawn out of the airbag 50.

The airbag module ABM is disposed in the seat cushion 11. The rear portion of the lower rear inflatable portion 58 is accommodated in the accommodation recess 14 of the seat pan 13 together with the gas generator 40. A part of the airbag 50 that is not accommodated in the accommodation recess 14 is disposed between the seat pan 13 and the cushion part 12 in a state of being spread in a planar shape without being filled with inflation gas. The front inflatable portion 57 of the spread airbag 50 is located on the lower side of the femur PF of the occupant P1 seated in the seat cushion 11, while the lower rear inflatable portion 58 is located on the lower side of the buttocks PB.

The plurality of bolts 43 protruding respectively downward from the airbag 50 are inserted through a bottom portion of the accommodation recess 14. Nuts 44 screw respectively into the bolts 43 from a lower side thereof, so that the gas generator 40 is fastened to the accommodation recess 14 together with the airbag 50.

The tilting plate 70 is formed of a material harder than the airbag 50, for example, a metal and a resin, and is disposed between the seat pan 13 and the cushion part 12. The tilting plate 70 that is supported to be tiltable in the upper-lower direction by a shaft 71 provided to a seat frame (not illustrated) on a rear side of the front inflatable portion 57. The shaft 71 may be provided to the airbag 50 instead of the seat frame.

The tilting plate 70 includes a flat pressure receiving portion 72 that receives pressure of inflation gas from a lower side through at least the front inflatable portion 57 of the inflatable portion. The pressure receiving portion 72 is provided forward of the lower rear inflatable portion 58, and is not provided between the lower rear inflatable portion 58 and the cushion part 12.

As described above, the airbag apparatus includes the shock sensor 75 and the control apparatus 76 in addition to the airbag module ABM and the tilting plate 70. The shock sensor 75 includes an acceleration sensor or the like that detects a shock applied to the vehicle from front. The control apparatus 76 controls operation of the inflator 41 based on a detection signal from the shock sensor 75.

The airbag apparatus according to the first embodiment is configured as described above. Next, operation and effects of the airbag apparatus will be described.

When no shock is applied to the vehicle from front of the vehicle seat 10 due to a front collision, the control apparatus 76 does not output to the gas generator 40 an operation signal for operating the gas generator 40, and the gas generator 40 does not supplied inflation gas to the inflatable portion. The part of the airbag 50 excluding the part accommodated in the accommodation recess 14 continues to be disposed between the seat pan 13 and the cushion part 12 in a state of being spread in a planar shape (see FIGS. 1 and 3).

When a shock is applied to the vehicle from front of the vehicle seat due to a front collision of the vehicle or the like, the occupant P1 moves forward due to inertia. At this time, the occupant P1 is held on the seat cushion 11 by holding action of the seat belt apparatus 30 when seated in the vehicle seat 10 in a proper posture suitable for manual driving. That is, the waist PP to move forward is caught by the lap belt portion 34 of the seat belt apparatus 30. The lap belt portion 34 restrains the waist PP and restricts forward movement thereof.

When the occupant P1 is in a comfortable posture, that is, when the vehicle is automatically driven and the occupant P1 is leaning on the seat back 21 turned rearward relative to in manual driving, an upper body of the occupant P1 and the lap belt portion 34 are reclined rearward relative to in manual driving. At this time, the waist PP may not be properly caught by the lap belt portion 34 when a shock is applied to the vehicle. In this case, a performance of the lap belt portion 34 to restrain the waist PP is not sufficiently exhibited, and the waist PP may pass through the lap belt portion 34 and move forward.

On the other hand, when a shock greater than or equal to a predetermined value is applied to the vehicle due to the shock from front and is detected by the shock sensor 75, the control apparatus 76 outputs to the gas generator 40 an operation signal for operating the gas generator 40 based on a detection signal. In response to the operation signal, the gas generator 40 supplies inflation gas to the lower rear inflatable portion 58. The lower rear inflatable portion 58 inflates on the lower side of the buttocks PB of the occupant P1 due to inflation gas, so that a part of the cushion part 12 on the lower side of the buttocks PB is pushed up. A part of the seat surface 11a of the seat cushion 11 on the lower side of the buttocks PB is raised, so that the buttocks PB are pushed up and the waist PP is pressed against the lap belt portion 34. Accordingly, the lap belt portion 34 is also reclined to the same level as in manual driving. The performance of the lap belt portion 34 to restrain the waist PP is enhanced, and the forward movement of the waist PP is restricted.

Further, a part of inflation gas supplied to the lower rear inflatable portion 58 is, as illustrated in FIG. 4, supplied to the front inflatable portion 57 through the connection portion 59. The front inflatable portion 57 inflates on the lower side of the femur PF of the occupant P1 due to inflation gas, so that a part of the cushion part 12 on the lower side of the femur PF is pushed up. A part of the seat surface 11a of the seat cushion 11 on the lower side of the femur PF is raised. The femur PF are pushed up by the raised part of the seat surface 11a. Accordingly, the buttocks PB are pushed up and the waist PP is pressed against the lap belt portion 34. The performance of the lap belt portion 34 to restrain the waist PP is further enhanced, and the forward movement of the waist PP is further restricted. Further, the raised part of the seat surface 11a of the seat cushion 11 on the lower side of the femur PF reclines the femur PF to be higher toward a front side, so as to restrict the femur PF and further the waist PP from moving forward.

An inflation thickness of the inflatable portion including the front inflatable portion 57 decreases as approaching a peripheral portion thereof. Accordingly, an amount for the inflatable portion to push up the cushion part 12 and raise the seat surface 11a decreases as approaching the peripheral portion.

In this regard, the pressure receiving portion 72 of the tilting plate 70 according to the first embodiment receives pressure of inflation gas from a lower side through at least the front inflatable portion 57 of the inflatable portion of the airbag. The tilting plate 70 is supported to be tiltable in the upper-lower direction by the shaft 71 provided rearward of the front inflatable portion 57. For this reason, when the pressure receiving portion 72 receives pressure of inflation gas from the lower side as described above, as illustrated in FIG. 5, the tilting plate 70 is tilted upward with the shaft 71 as a fulcrum, and is reclined greater than before tilting (see FIG. 3). An amount for the front inflatable portion 57 to push up the part of the cushion part 12 on the lower side of the femur PF is the same as an amount at a part having a large inflation thickness even at a part having a small inflation thickness, since the flat pressure receiving portion 72 is interposed therebetween. Therefore, compared with a case without the tilting plate 70, both a performance of pushing up the buttocks PB and pressing the waist PP against the lap belt portion 34 and a performance of reclining the femur PF to be higher toward the front side thereof are improved.

According to the first embodiment, the following effects can be obtained in addition to those described above.

The gas generator 40 is disposed (built-in) in the lower rear inflatable portion 58 that is located on the lower side of the buttocks PB of the occupant P1. Therefore, inflation gas is first supplied to the lower rear inflatable portion 58 from the gas generator 40, so that it is possible to push up the buttocks PB through the cushion part 12.

When the hard pressure receiving portion 72 is located on the lower side of the buttocks PB, sitting comfort is impaired. However, the pressure receiving portion 72 is provided forward of the lower rear inflatable portion 58, and is not provided between the lower rear inflatable portion 58 and the cushion part 12. For this reason, it is possible to prevent a decrease in sitting comfort caused by the pressure receiving portion 72.

In the first embodiment, the connection portion 59 extending in the front-rear direction, which connects the front inflatable portion 57 and the lower rear inflatable portion 58, is provided at a plurality of parts (three parts) of the airbag 50 in the vehicle width direction. For this reason, even if inflation gas does not flow in a part of the connection portion 59, inflation gas can be supplied from the lower rear inflatable portion 58 to the front inflatable portion 57 through the remaining connection portion 59.

Next, the second embodiment embodied in a vehicle (seat cushion) airbag apparatus will be described with reference to FIGS. 6 to 8.

In the second embodiment, a configuration of a rear inflatable portion in an inflatable portion of the airbag 50 is largely different from that in the first embodiment. That is, in the second embodiment, the rear inflatable portion is mounted on the seat pan 13, as is illustrated in FIG. 8. The rear inflatable portion includes the lower rear inflatable portion 58 in which the gas generator 40 is built and an upper rear inflatable portion 61 mounted on the lower rear inflatable portion 58. More specifically, as illustrated in FIGS. 6 and 7, the upper fabric portion 52 in the first embodiment is integrally provided with an upper extension fabric portion 62. Similarly, the lower fabric portion 53 is integrally provided with a lower extension fabric portion 63 (see FIG. 8).

In the first embodiment, the upper fabric portion 52 and the lower fabric portion 53 are coupled by the peripheral coupling portion 54 provided on entire peripheries thereof. In the second embodiment, however, the peripheral coupling portion 54 is not provided at a boundary part between the upper fabric portion 52 and the upper extension fabric portion 62 or a boundary part between the lower fabric portion 53 and the lower extension fabric portion 63, as is illustrated in FIGS. 6 and 7.

The upper extension fabric portion 62 and the lower extension fabric portion 63 are coupled by an extension peripheral coupling portion 64 provided at peripheral portions thereof. The extension peripheral coupling portion 64 is not provided at the boundary part between the upper fabric portion 52 and the upper fabric portion 52 or at the boundary part between the lower fabric portion 63 and the lower fabric portion 53. A region between the upper and lower extension fabric portions 62 and 63 that is surrounded by the extension peripheral coupling portion 64 forms the upper rear inflatable portion 61 that inflates by inflation gas that passes through the lower rear inflatable portion 58.

A seam allowance part in the upper extension fabric portion 62 and the lower extension fabric portion 63, which is on an external side of the extension peripheral coupling portion 64, forms a second non-inflatable portion 65 to which inflation gas is not supplied and thus does not inflate.

A pair of end portions 64a of the extension peripheral coupling portion 64 is connected respectively to end portions 54a of the peripheral coupling portion 54 that face the end portions 64a. With these connections, the lower rear inflatable portion 58 and the upper rear inflatable portion 61 are coupled to each other at respective rear end portions thereof.

The upper rear inflatable portion 61 is folded upward and forward at a boundary part with the lower rear inflatable portion 58 along a fold line 66 extending in the vehicle width direction, as is indicated by an arrow in FIG. 7. With this folding, the upper rear inflatable portion 61 is mounted on: most of the lower rear inflatable portion 58; a portion of the connection portion 59 in the front-rear direction; and a portion of each of the first non-inflatable portions 56 in the front-rear direction, as is illustrated in FIG. 6.

The lower rear inflatable portion 58 and the upper rear inflatable portion 61 are connected with each other by the peripheral coupling portion 54 at a part of the rear end portion of the lower rear inflatable portion 58 where the upper fabric portion 52 and the lower fabric portion 53 are not coupled, and are connected with each other by the extension peripheral coupling portion 64 at a part of the rear end portion of the upper rear inflatable portion 61 where the upper extension fabric portion 62 and the lower extension fabric portion 63 are not coupled.

In the second embodiment, the first non-inflatable portions 56 are longer rearward than in the first embodiment; a capacity of the lower rear inflatable portion 58 is smaller than that in the first embodiment. Positions of front ends of the first non-inflating portions 56 in the front-rear direction are the same as or substantially the same as those in the first embodiment; the front inflatable portion 57 has a capacity similar to that of the front inflatable portion 57 in the first embodiment.

Further, in the second embodiment, a part of the second non-inflatable portion 65 in front of the upper rear inflatable portion 61 is coupled to the first non-inflatable portions 56 by a coupling portion 67 extending linearly in the vehicle width direction. The number (two) of the coupling portion 67 is equal to the number of the first non-inflatable portions 56. The coupling portion 67 is formed by sewing the second non-inflatable portion 65 to the first non-inflatable portions 56.

Configurations other than the above are the same as those in the first embodiment. Therefore, the same elements as those described in the first embodiment are denoted by the same reference numerals, and repetitive descriptions thereof are omitted.

Figure 8:
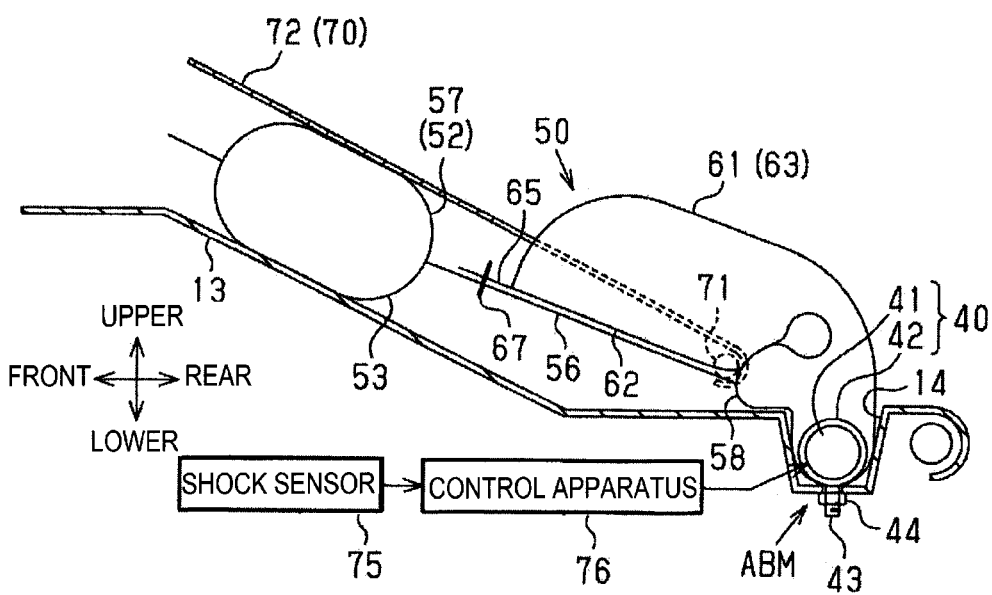
FIG. 8 is a side cross-sectional view illustrating a state of the seat cushion airbag apparatus when an inflatable portion of an airbag inflates according to the second embodiment.

In the second embodiment, when a shock is applied to a vehicle from front of the vehicle seat 10, inflation gas is first supplied to the lower rear inflatable portion 58 mounted on the seat pan 13 from the gas generator 40 in response to the shock, as is illustrated in FIG. 8. A part of inflation gas supplied to the lower rear inflatable portion 58 is supplied to the upper rear inflatable portion 61 that is mounted on the lower rear inflatable portion 58 and connected therewith. The lower rear inflatable portion 58 and the upper rear inflatable portion 61 inflate on a lower side of the buttocks PB of the occupant P1, respectively. Therefore, a rear inflatable portion inflates to a higher position as compared with a case where the rear inflatable portion includes the lower rear inflatable portion 58 only. Accordingly, the buttocks PB are pushed up to a higher position compared with the case where the rear inflatable portion includes the lower rear inflatable portion 58 only, and are strongly pressed against the lap belt portion 34. A performance of the lap belt portion 34 to restrain the waist PP is further enhanced, and forward movement of the waist PP is further restricted.

Further, a part of inflation gas supplied to the lower rear inflatable portion 58 is supplied to the front inflatable portion 57 through the connection portion 59, which is similar to the first embodiment. Accordingly, the front inflatable portion 57 inflates on a lower side of the femur PF. The pressure receiving portion 72 of the tilting plate 70 receives pressure of inflation gas from a lower side through at least the front inflatable portion 57 of the inflatable portion of the airbag 50, and is tilted upward with the shaft 71 as a fulcrum. Therefore, a performance of pushing up the femur PF and pressing the waist PP against the lap belt portion 34 and a performance of reclining the femur PF to be higher toward the front side thereof are improved in the same manner as in the first embodiment.

According to the second embodiment, the following effects can be obtained in addition to those described above.

The upper rear inflatable portion 61 mounted on the lower rear inflatable portion 58 is connected thereto at its own rear end portion. The second non-inflatable portion 65 is coupled to the first non-inflatable portions 56 by the coupling portion 67. Therefore, the upper rear inflatable portion 61 inflates on the lower rear inflatable portion 58 in a stable state.

The first non-inflatable portions 56 and the second non-inflatable portion 65 are coupled by the coupling portion 67. For this reason, the coupling portion 67 is unlikely to hinder inflation of portions of the inflatable portion, that is, the front inflatable portion 57, the lower rear inflatable portion 58, the upper rear inflatable portion 61, and the connection portion 59. The coupling portion 67 is unlikely to be broken even when the portions of the inflatable portion inflate, so that coupling by the coupling portion 67 is well maintained.

The above embodiments can also be implemented as modifications modified as follows.

The airbag 50 may be disposed between the seat pan 13 and the cushion part 12 in a folded state.

Regions between the upper fabric portion 52 and the lower fabric portion 53 that are surrounded by the annular coupling portions 55 may be hollowed out. Even in this manner, the same regions can be defined as the first non-inflatable portions 56.

The airbag 50 may adopt a shape different from that having a rectangular shape in a plan view in the first and the second embodiments.

The pressure receiving portion 72 of the tilting plate 70 may receive, from a lower side, pressure of inflation gas through other constituent portions of the inflatable portion in addition to the front inflatable portion 57, for example, a front portion of the lower rear inflatable portion 58.

The second non-inflatable portion 65 may be coupled to the first non-inflatable portions 56 by the coupling portion 67 at a part different from that in the second embodiment, for example, both lateral parts of the upper rear inflatable portion 61 in the vehicle width direction.

Figure 9:
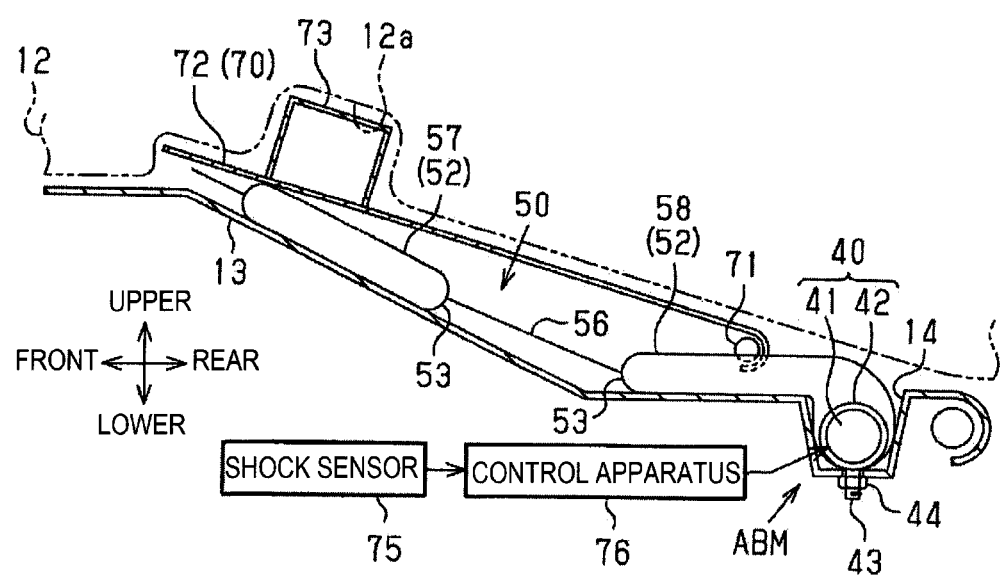
FIG. 9 illustrates a modification in which a protrusion is provided on a tilting plate, and is a side cross-sectional view illustrating a state of a seat cushion airbag apparatus before an inflatable portion of an airbag inflates corresponding to FIG. 3.

FIG. 9 illustrates a modification of the airbag apparatus according to the first embodiment. In this modification, a protrusion 73 protruding upward from the tilting plate 70 is added to a part thereof on a lower side of the femur PF. The protrusion 73 is formed by bending a metal plate material or by molding a resin material, and is fixed to the tilting plate 70. The cushion part 12 is provided with a recess 12a that is opened on a lower surface thereof, in which the protrusion 73 is accommodated.

In FIG. 9, the same elements as those described in the first embodiment are denoted by the same reference numerals.

According to this modification, the protrusion 73 does not push up the cushion part 12 when no shock is applied to a vehicle from front of the vehicle seat 10 and no inflation gas is supplied to an inflatable portion from the gas generator 40. A part of the seat surface 11a of the seat cushion 11 on the lower side of the femur PF is not raised.

In contrast, the tilting plate 70 is tilted upward with the shaft 71 as a fulcrum when a shock is applied to the vehicle from front of the vehicle seat 10. The front inflatable portion 57 inflates due to inflation gas supplied from the gas generator 40. The pressure receiving portion 72 receives pressure of inflation gas from a lower side. The protrusion 73 moves upward integrally with the tilting plate 70 with the tilting thereof. The protrusion 73 restricts the femur PF from moving forward. Therefore, a performance of restricting forward movement of the waist PP can be enhanced compared with a case without the protrusion 73.

Although not illustrated, the second embodiment can also be modified in the same manner as described above (adding of the protrusion 73 and the recess 12a).

The airbag apparatus is also applicable to a vehicle seat disposed in a vehicle in which the seat back 21 faces a direction different from the front-rear direction of the vehicle when the occupant P1 is seated, for example, a direction orthogonal to the front-rear direction (vehicle width direction). The airbag apparatus is also applicable to any of a plurality of vehicle seats arranged in a vehicle interior in the front-rear direction.

The airbag apparatus is also applicable to a type of vehicle seat in which a part of a seat frame that serves as a support portion is formed by a stretched wire frame portion instead of the seat pan 13.

A vehicle to which the airbag apparatus is applied includes not only a private car but also various industrial vehicles.

The airbag apparatus is not limited to a vehicle, and is also applicable to an airbag apparatus installed in a vehicle seat in other vehicles such as an aircraft or a ship.

What is claimed is:

1. A seat cushion airbag apparatus applied to a vehicle seat in which a seat cushion includes a cushion part and a support portion that supports the cushion part from a lower side, wherein:
    an airbag, including an inflatable portion, is disposed between the support portion and the cushion part;
    the inflatable portion is configured to be inflated by inflation gas supplied from a gas generator so that a seat surface of the seat cushion is raised to restrict forward movement of a waist of an occupant on the seat cushion;
    the inflatable portion includes:
        a rear inflatable portion that includes the gas generator and configured to inflate on a lower side of buttocks of the occupant;
        a front inflatable portion that is configured to inflate on a lower side of a femur of the occupant; and
        a connection portion that connects the rear inflatable portion and the front inflatable portion; and
    a tilting plate is disposed between the support portion and the cushion part and is supported to be tiltable in an upper-lower direction by a shaft provided rearward of the front inflatable portion, the tilting plate including a flat pressure receiving portion that receives pressure of inflation gas from a lower side through at least the front inflatable portion, wherein
    the rear inflatable portion includes:
        a lower rear inflatable portion that is mounted on the support portion and is connected to the front inflatable portion by the connection portion; and
        an upper rear inflatable portion that is mounted on the lower rear inflatable portion and is connected to the lower rear inflatable portion, wherein
    the lower rear inflatable portion and the upper rear inflatable portion are connected with each other at their respective rear end portions;
    the airbag includes:
        a first non-inflatable portion that does not inflate by inflation gas at a part between the front inflatable portion and the lower rear inflatable portion that is different from the connection portion, and
        a second non-inflatable portion that does not inflate by inflation gas on an external side of the upper rear inflatable portion; and
    the second non-inflatable portion is coupled to the first non-inflatable portion by a coupling portion.

2. The seat cushion airbag apparatus according to claim 1, wherein
    the pressure receiving portion is provided forward of the rear inflatable portion.

* * * * *